Feb. 19, 1929.  1,702,456
W. E. TRUMPLER
VIBRATION METER
Filed March 21, 1927    3 Sheets-Sheet 1

INVENTOR
William E. Trumpler
BY
ATTORNEY

Feb. 19, 1929.

W. E. TRUMPLER 1,702,456

VIBRATION METER

Filed March 21, 1927   3 Sheets-Sheet 2

WITNESSES:
Carl J. Loesch
Lyman D. Oberlin

INVENTOR
William E. Trumpler
BY
Chesley F. Carr
ATTORNEY

Patented Feb. 19, 1929.

1,702,456

UNITED STATES PATENT OFFICE.

WILLIAM E. TRUMPLER, OF NEW YORK, N. Y., ASSIGNOR TO WESTINGHOUSE ELECTRIC & MANUFACTURING COMPANY, A CORPORATION OF PENNSYLVANIA.

VIBRATION METER.

Application filed March 21, 1927. Serial No. 177,023.

My invention relates to mechanism for actuating a member, such as one indicating the magnitude of impulses developed by a vibrating surface or object, and has particular relation to an arrangement for transmitting the impulse-energy to the indicating member.

In accordance with my invention, a member, such as a pointer or indicator mounted for oscillatory movement, is moved in one direction by a suitable structure, preferably resilient in character, energy being transmitted to said structure from the impulse-transmitting surface only during movement of said member in a direction the reverse of said one direction.

Further, in accordance with my invention, the aforesaid structure preferably comprises a leaf spring controlled by an inertia member which, in turn, is actuated by the vibratory surface, the construction and arrangement of the parts being such that, in the event of damage or deformity to the leaf spring by impulses of an excessive magnitude, a new spring may be readily substituted therefor.

My invention resides in mechanism of the character hereinafter described and claimed.

For an understanding of one of the forms my invention may take, reference is to be had to the accompanying drawings, in which.

Figure 1:
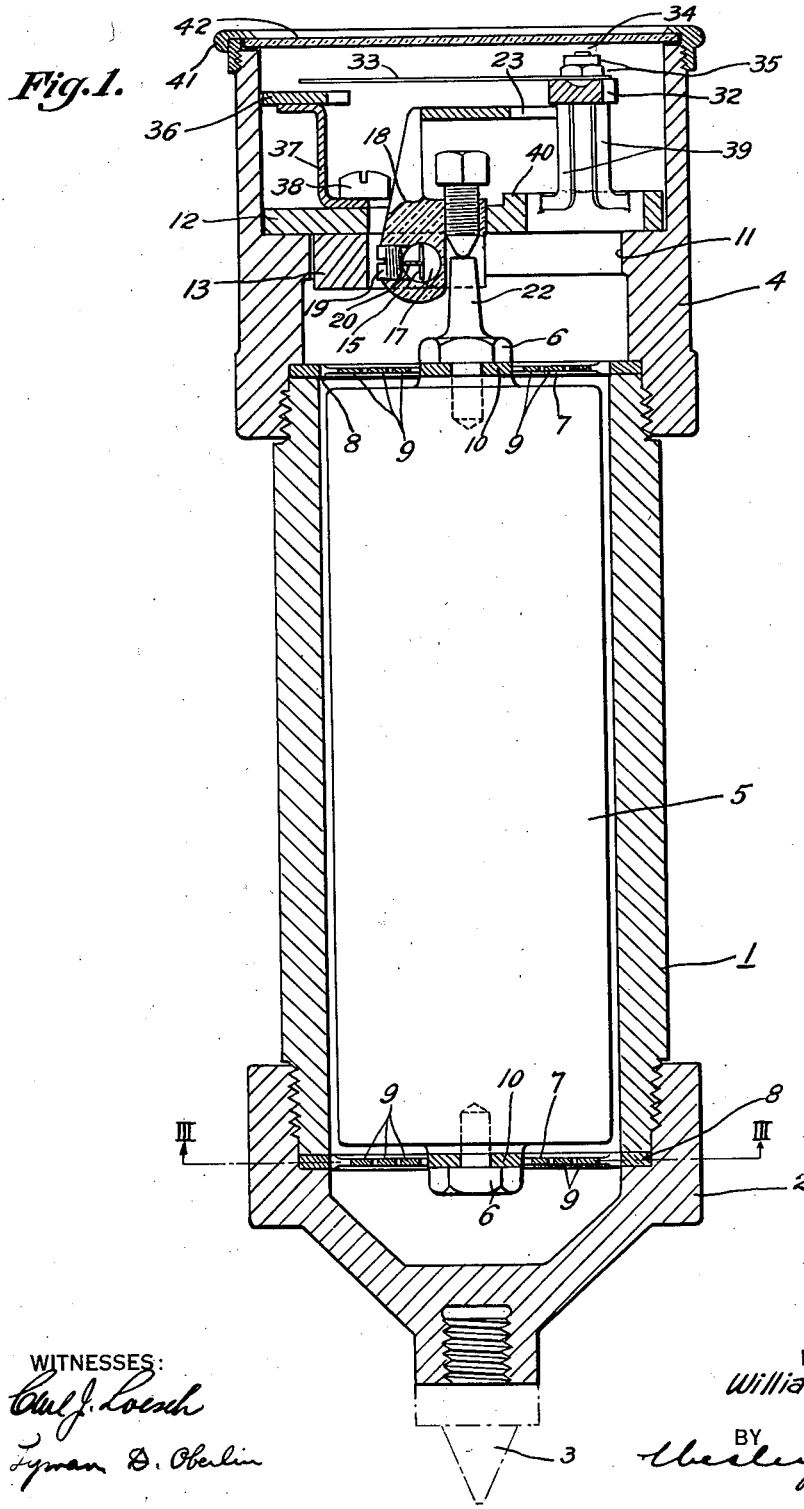
Figure 1 is a vertical sectional view of apparatus constructed in accordance with my invention.

As a safety and precautionary measure, it is highly desirable, in many industrial fields, that information be obtained concerning the magnitude of the vibratory impulses developed in moving machinery. To this end, it has been proposed that an oscillatory pointer be operated by providing a direct mechanical connection between the pointer and the source of the vibratory impulses. An arrangement of this character is objectionable in that the delicate or fragile pivotal supporting structure for the oscillatory pointer is often damaged when the vibrational impulses assume an excessive magnitude.

In accordance with my invention, I utilize delicate and an easily fractured supporting structure for the oscillatory pointer but depart from the prior practice in that the pointer is indirectly, rather than directly, oscillated by the vibrating surface. To this end, I may provide a leaf spring or the like which is successively placed under tension by each vibratory impulse, the energy of the spring being applied, during intervening intervals, to the pointer to produce its oscillation.

In the drawings is illustrated a preferably cylinderical casing or housing 1 to one end of which is threaded or otherwise suitably secured a member or cap 2 terminating in a pointer or contact member 3. The latter may be formed integrally with the member 2 but, in accordance with the preferred form of my invention, is detachably secured thereto, as illustrated.

Threaded or otherwise suitably secured to the other end of casing 1 is a housing structure 4.

Within the casing 1 is mounted a relatively heavy weight or inertia member 5 of any suitable material, such as iron, brass or the like. The inertia member 5 has secured to opposite ends thereof, preferably by bolts 6, the respective resilient members 7, 7, one of which, in the example shown, is clamped between the cap 2 and the casing 1 and the other between the housing structure 4 and the casing 1.

Figure 3:
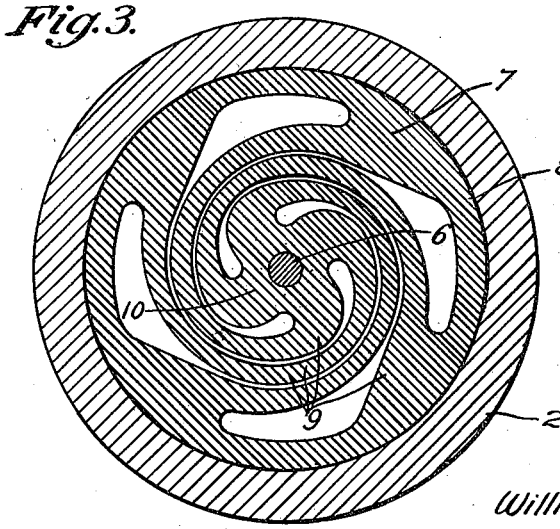
Fig. 3 is a transverse horizontal sectional view taken on the line III—III of Fig. 1.

As illustrated in Figs. 1 and 3, each of the resilient members 7, 7 is plate-like and comprises a circumferential ring 8 from which spirally extend the spaced elements 9, all of which terminate in a member 10 adapted to engage the head of a bolt 6.

The members 7, 7 and particularly the elements 9 thereof, may be constructed of any suitable material of resilient character, such, for example, as spring steel or phosphor bronze.

Figure 4:
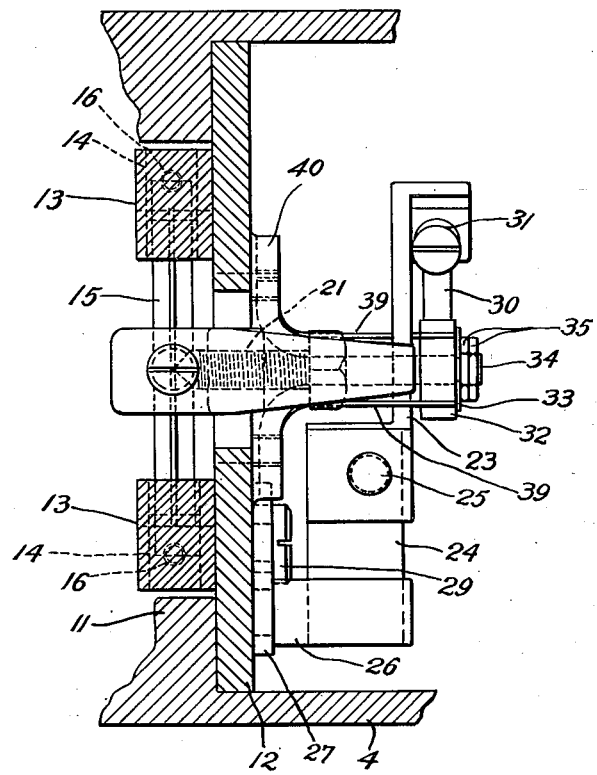
Fig. 4 is a vertical sectional view taken on the line IV—IV of Fig. 2, looking in the direction of the arrows.
Figure 5:
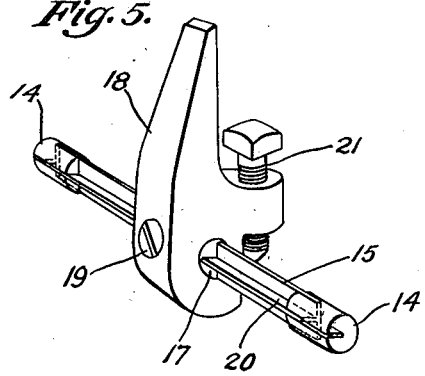
Fig. 5 is an enlarged perspective view of structure included in my novel form of apparatus.

In the example illustrated, the housing structure 4 comprises a circumferential inwardly extending flange 11 upon which the plate or shelf 12 rests. Suitably secured to the under side of the plate 12, as viewed in Fig. 1, is a U-shape member 13, opposite legs of which are preferably circularly perforated or recessed for the reception of readily detachable plugs or members 14, 14, (Figs. 2, 4 and 5), to which are suitably secured, respectively, the ends of the member 15. In the example illustrated, the plugs 14 are formed integral with the aforesaid member 15 or said plugs 14 may be slotted and the ends of said member 15 be soldered therein. Set screws 16 may be utilized to fixedly secure the plugs 14 in their respective perforations or recesses.

Intermediate its ends, the member 15 has soldered or otherwise suitably secured thereto, a plug or member 17, (Figs. 1 and 5), received in a perforation in a lever 18 which extends through an opening in the plate 12. Plug 17 may be non-rotatably secured with respect to lever 18 by a set screw 19 or the like.

Under some circumstances, it may be desirable to utilize a strengthening rib 20, formed either integral with, or separate from, the rib 15 and soldered or otherwise suitably secured in slots in the plugs 14, 14 and 17.

The ribs 15 and 20 should be constructed of suitable elastic material, such as spring steel or phosphor bronze. In operation, the ribs 15 and 20 serve in lieu of a shaft for supporting lever 18 for oscillatory movement.

The lever 18 comprises a lateral arm in which is adjustably mounted a screw or member 21 co-acting, at one end, with a member movable with the weight 5, such, for example, as an upward extension 22 of the bolt 6.

The upper end of the lever 18, (Fig. 1), co-acts with a lever 23 mounted for pivotal movement preferably by utilizing a leaf spring 24, one end of which is secured, by a screw or bolt 25, to one end of said lever 23, the other end of the leaf spring 24 being secured to a post 26 carried by a plate 27 slotted at 28 for the reception of a bolt or screw 29 co-acting with the plate 12.

In the form of my invention herein disclosed, one end of a link 30, preferably a leaf spring, is secured to that end of lever 23 which is removed from post 26 by a screw 31 or the like, the other end of said link 30 being secured to a disk or member 32. A pointer or indicating member 33 may be secured to the disk 32 in any suitable manner, as, for example, by passing the perforated end thereof over a screw 34 upstanding from said disk and utilizing one or more nuts 35 to clamp the same in position.

Pointer 33, at its free end, co-acts with, or plays over, a scale 36 carried by a member 37 suitably secured to the plate 12. In the example illustrated, screws 38 fasten member 37 to plate 12, and these screws may be utilized to secure the U-shape member 13 to plate 12.

The pointer 33 should be mounted for pivotal or oscillatory movement on the structure, which, only to a minimum degree, interferes with its free oscillatory movement. To this end, a supporting device of the character disclosed in my pending application, Serial No. 177,024, filed March 21, 1927, may be utilized. In the example illustrated, however, structure similar to that illustrated in my pending application Serial No. 39,996, filed June 27, 1925, is utilized, which structure comprises a plurality of flexible members 39 of thin resilient sheet metal or the like, depending from, and each secured at one end preferably in, a radial slot in the periphery of disk 32. Members 39 are substantially of L-shape and their other ends are likewise preferably secured in radial slots formed in a circumferential flange or wall 40 formed on the plate 12.

When desirable, the housing structure 4 may be provided with a cap 41 for retaining a transparent member 42 thereon.

The operation is as follows:

Initially, the spring member 15 is placed under a substantial degree of tension by loosening the screws 16 and rotating the plugs 14 in such direction that the lever 18 is moved clockwise (Fig. 1). The screws 16 are then moved into binding engagement with the plugs 14. By this operation, the lever 23 is swung in a clockwise direction (Fig. 2) to similarly deflect the pointer 33.

Thereupon, by adjusting the screw 21 toward the extension 22, the lever 18 is rotated in a counter-clockwise direction against the tension of spring member 15, and the resilient members 7 are placed under tension. As a result, the pointer 33 is moved to position substantially midway of the ends of scale 36 or such other zero position as may be desired.

Figure 2:
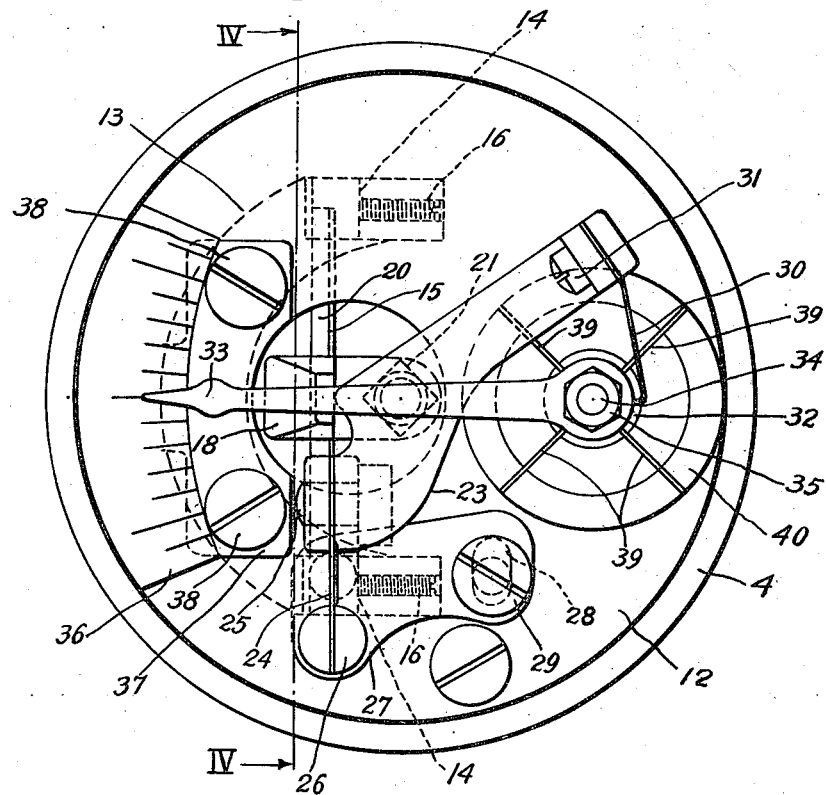
Fig. 2 is a plan view of the apparatus shown in Fig. 1.

If, during the aforesaid adjustment of screw 21, the end of lever 18 becomes disengaged from lever 23, or if the spring 24 becomes substantially untensioned, the screw 29 may be loosened and the plate 27 moved until the spring 24 is placed under such tension that it tends to rotate the lever 23 to a substantial degree in a counter-clockwise direction, (Fig. 2).

With the parts positioned as indicated in Fig. 1, the contact member 3 may be brought into engagement with any vibrating object or surface, as a machine element. As the vibrating object moves the member 3, cap 2, casing 1 and housing structure 4 upwardly, (Fig. 1), the inertia member 5, upper bolt 6 and its extension 22 remain substantially stationary. As a result, lever 18, because of the tension of spring 15, rotates in a clockwise direction, (Fig. 1), and, through the lever 23, leaf spring 30 and disk 32, the pointer 33 moves in a clockwise direction, (Fig. 2). By this action, energy is stored in the spring 24 and also, to some extent, in the pivotal supporting members 39 for the pointer 33.

When the contact member 3, cap 2, casing 1 and housing structure 4 move downwardly, contact being maintained between the extension 22 of the upper bolt 6 and the screw 21, the lever 18 is swung in a counter-clockwise direction, (Fig. 1), and the biasing effect of spring 15 on lever 23 is temporarily discontinued. Because of the tension effect of spring 24 and, to some degree, of the spring members 39, the lever 23 is now rotated in a counter-clockwise direction (Fig. 2), the nose of said lever following, and ordinarily remaining in contact with, the upper extension of lever 18. Simultaneously with this movement of lever 23, pointer 33 moves in a counter-clockwise direction until downward movement of said member 3, cap 2 and casing 1 ceases. Thereafter, the upward movement of the structure last noted is initiated and movement of said spring 15 again becomes effective to rotate lever 18 in a clockwise direction. Thus, in response to vibration of the object with which member 3 contacts, the pointer 33 is alternately moved first in one direction and then in the other.

A device of the character herein disclosed may advantageously be utilized when the vibratory rate is 150 to 300 impulses per second. Under such circumstances, the eye of the observer is unable to follow pointer 33 as it moves, the observation being confined to a determination of the limits between which the pointer oscillates.

In actual practice, with an instrument of the character herein disclosed, the distance between neighboring marks on the scale 36 has been chosen to correspond to movement of the vibrating object of $\frac{1}{1000}$ of an inch. It is to be understood, however, that my invention is not limited to determining vibratory impulses recurring at the rate mentioned, and that the scale 36 may be calibrated in any other way which may be found desirable.

The spring member 20 is desirably utilized to strengthen or reinforce the spring member 15. These two members may be integrally formed, although, ordinarily, it is sufficient if they are separate from each other.

An important feature of my invention resides in the arrangement for imparting oscillatory movement to the pointer 33. It will be observed that clockwise movement of the pointer 33 occurs when the extension 22 of bolt 6 is tending to recede from the adjustable element 21. At this time, as stated, spring member 15 rotates lever 18 in a clockwise direction, (Fig. 1). When said extension 22 moves lever 18 in a counter-clockwise direction, (Fig. 1), the upper arm thereof tends to move from the nose on lever 23. However, as described, the stored energy in spring 24 and spring members 39 causes the nose on said lever 23 to follow the upper arm of lever 18, counter-clockwise rotation of pointer 33 (Fig. 2), occurring at this time.

Accordingly, any energy transferred from the vibrating object to the lever 18 always effects counter-clockwise rotation thereof, (Fig. 1), and this causes the upper extension of lever 18 to tend to move from the nose on lever 23. Therefore, should the object with which contact member 3 is associated partake of excessive vibration, excessive counter-clockwise rotation of lever 18, (Fig. 1), will result, which, of course, may result in damage or deformation of the spring members 15 and 20. However, the pivotal supporting structure for the pointer 33, such as the members 39 herein disclosed or those illustrated in my aforesaid pending application, Serial No. 177,024, filed March 21, 1927, will not be damaged by the excessive vibration. This supporting structure for the pointer 33 is easily damaged, quite expensive and difficult to assemble. On the other hand, the spring members 15 and 20, if permanently deformed, may be readily replaced. In this manner, the most delicate part of the entire mechanism is protected against damage.

In the ordinary operation of the apparatus, the extention 22 and member 21 remain constantly in engagement, as do the upper extension of lever 18 and the nose on lever 23. But, if, for any reason, such as slight permanent deformation of spring members 15 and 20, it should happen that separation of the above noted parts should occur in either of the two regions, then each vibratory impulse would produce a slap as the separated parts would come into engagement. If the vibratory impulses are of such magnitude as to produce large movements of the member 3, cap 2, casing 1 and structure 4, under the conditions noted, injury to the fragile members 39, or equivalent, may result. Therefore, it is desirable that the cap 2 and housing structure 4 be provided with stop members, not shown, to prevent excessive vibration of member 3, cap 2, casing 1 and structure 4 with respect to the inertia member 5.

Apparatus of the character herein described is often used to determine the magnitude of vibrations existing in electrical machinery. Therefore, to prevent short-circuiting effects, it may be desirable to construct the casing 1 and cap 2 of insulating material, such as fibre or a phenol-condensation product. Likewise, under some circumstances, it may be desirable to construct the contact member 3 of similar insulating material.

I claim as my invention:

1. Vibration-indicating mechanism comprising a pointer, means including fragile resilient members for mounting said pointer for oscillatory movement, an actuating member for said pointer, a pivoted member subjected to impulse vibrations detachably related to said actuating member and rotating in one direction when transmitting each impulse, and resilient means for imparting oscillatory movement to said pointer, said resilient means receiving energy from said actuating member as it moves in said one direction.

2. Vibration-indicating mechanism comprising a pointer, means including fragile resilient members for mounting said pointer for oscillatory movement, an actuating member for said pointer, a pivoted member subjected to impulse vibrations detachably related to said actuating member and rotating in one direction when transmitting each impulse, resilient means for imparting oscillatory movement to said pointer, and a support on which said resilient means is detachably mounted, said resilient means receiving energy from said actuating member as it moves in said one direction.

3. Vibration-indicating mechanism comprising a pointer, means including fragile resilient members for mounting said pointer for oscillatory movement, a spring-controlled actuating member for said pointer, a pivoted member subjected to impulse vibrations detachably related to said actuating member and rotating in one direction when transmitting each impulse, resilient means for imparting oscillatory movement to said pointer, and a support on which said resilient means is detachably mounted, said resilient means receiving energy from said actuating member as it moves in said one direction.

4. Vibration-indicating mechanism comprising a pointer, means including fragile resilient members for mounting said pointer for oscillatory movement, a base for said resilient members, a post projecting from said base and adjustable thereon, an actuating member for said pointer, a leaf spring connecting said post and actuating member, a pivoted member subjected to impulse vibrations detachably related to said actuating member for normally contacting therewith, said actuating member rotating in one direction when transmitting each impulse, a leaf spring for imparting oscillatory movement to said pivoted member, a support in which said leaf spring is detachably mounted, said leaf spring receiving energy from said actuating member as it moves in said one direction, and a member detachably related to said pivoted member for normally contacting therewith, said last named member transmitting impulse vibrations to said pivoted member.

5. The combination with a pointer, of means for oscillating said pointer comprising a reciprocatory inertia member, a casing of insulating material for said inertia member and movable with respect thereto, and a resilient member carried by said casing for supporting said inertia member.

6. Vibration-indicating mechanism comprising a pointer supported for oscillatory movement, an actuating member for said pointer, a pivoted member subjected to impulse vibrations detachably related to said actuating member and rotating in one direction when transmitting each impulse, and resilient means for imparting oscillatory movement to said pointer, said resilient means receiving energy from said actuating member as it moves in said one direction.

In testimony whereof, I have hereunto subscribed my name this 15th day of March, 1927.

WILLIAM E. TRUMPLER.